United States Patent
McColgan et al.

(10) Patent No.: US 9,067,163 B2
(45) Date of Patent: Jun. 30, 2015

(54) PARTICLE SEPARATOR

(71) Applicant: Hamilton Sundstrand Corporation, Windsor Locks, CT (US)

(72) Inventors: Charles J. McColgan, West Granby, CT (US); Peter Bizzaro, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 24 days.

(21) Appl. No.: 13/871,426

(22) Filed: Apr. 26, 2013

(65) Prior Publication Data

US 2014/0318089 A1 Oct. 30, 2014

(51) Int. Cl.
| | |
|---|---|
| *B01D 45/00* | (2006.01) |
| *B01D 45/08* | (2006.01) |
| *B64D 13/00* | (2006.01) |
| *B01D 45/16* | (2006.01) |
| *B64D 13/06* | (2006.01) |

(52) U.S. Cl.
CPC ............... *B01D 45/08* (2013.01); *B01D 45/16* (2013.01); *B64D 13/00* (2013.01); *B64D 2013/0651* (2013.01); *Y02T 50/56* (2013.01)

(58) Field of Classification Search
CPC ........ B01D 45/08; B01D 45/16; B64D 13/00; B64D 2013/0651; Y02T 50/56
USPC ................... 55/423, 466, 440–446, 462–465
See application file for complete search history.

(56) References Cited

U.S. PATENT DOCUMENTS

| | | | |
|---|---|---|---|
| 1,600,762 A * | 9/1926 | Hawley ............................ 95/268 |
| 3,993,463 A | 11/1976 | Barr | |
| 4,035,171 A * | 7/1977 | Reed et al. ....................... 96/190 |
| 4,263,025 A * | 4/1981 | Godare ............................ 96/189 |
| 4,292,050 A | 9/1981 | Linhardt et al. | |
| 4,304,094 A | 12/1981 | Amelio | |
| 4,527,387 A | 7/1985 | Lastrina et al. | |
| 4,685,942 A | 8/1987 | Klassen et al. | |
| 6,524,373 B2 | 2/2003 | Afeiche et al. | |
| 6,562,108 B2 | 5/2003 | Durner et al. | |
| 6,688,558 B2 | 2/2004 | Breer et al. | |
| 6,752,845 B2 | 6/2004 | Haland | |
| 6,852,146 B2 | 2/2005 | Holmes et al. | |
| 7,691,185 B2 | 4/2010 | Darke et al. | |
| 7,866,600 B2 | 1/2011 | Barnard et al. | |
| 8,092,145 B2 | 1/2012 | Martel et al. | |
| 8,425,641 B2 | 4/2013 | Chaudhari et al. | |

(Continued)

FOREIGN PATENT DOCUMENTS

WO 0209846 A2 2/2002

OTHER PUBLICATIONS

Extended Search Report issied in EP Application No. 14165231.3 on Oct. 6, 2014.

*Primary Examiner* — Dung H Bui
(74) *Attorney, Agent, or Firm* — Cantor Colburn LLP

(57) ABSTRACT

A particle separator is provided and includes a vessel and a scupper. The vessel is receptive of a fluid flow and configured to output the fluid flow at first and second outlets. The vessel includes a curved, inwardly facing surface. The scupper is disposed within the vessel to define a first flowpath along which the received fluid flow is directed to flow toward the first outlet between the curved, inwardly facing surface and a first side of the scupper, and a second flowpath along which the received fluid flow is directed to flow toward the second outlet along a second side of the scupper, which is opposite the first side.

17 Claims, 2 Drawing Sheets

(56) References Cited

U.S. PATENT DOCUMENTS

| | | |
|---|---|---|
| 2004/0007132 A1 | 1/2004 | Holmes et al. |
| 2005/0194295 A1 | 9/2005 | North |
| 2006/0021356 A1 | 2/2006 | Milde |
| 2008/0047425 A1 | 2/2008 | Loda et al. |
| 2011/0047959 A1 | 3/2011 | DiBenedetto |
| 2012/0168361 A1 | 7/2012 | Motakef |

* cited by examiner

PARTICLE SEPARATOR

BACKGROUND OF THE INVENTION

The subject matter disclosed herein relates to a particle separator and, more particularly, to a particle separator for airflow into a cabin of an aircraft.

In an aircraft, airflow from a condenser heat exchanger typically has liquid water droplets and air mixed together. It is often desirable for this liquid water to be collected before the airflow is permitted to proceed toward the occupied cabin so that the water droplets can be removed to thereby prevent problems with moisture and humidity in the occupied cabin. Various methods and systems have been proposed to collect and then remove the water droplets. These include forcing the airflow to swirl such that the water droplets travel to an outer wall of the swirler due to centrifugal force. At the outer wall, the water droplets are collected for removal. In current applications, however, air velocities in the inlet ducts of the swirlers are very high. These high velocities lead to large pressure losses.

BRIEF DESCRIPTION OF THE INVENTION

According to one aspect of the invention, a particle separator is provided and includes a vessel and a scupper. The vessel is receptive of a fluid flow and configured to output the fluid flow at first and second outlets. The vessel includes a curved, inwardly facing surface. The scupper is disposed within the vessel to define a first flowpath along which the received fluid flow is directed to flow toward the first outlet between the curved, inwardly facing surface and a first side of the scupper, and a second flowpath along which the received fluid flow is directed to flow toward the second outlet along a second side of the scupper, which is opposite the first side.

According to another aspect of the invention, a particle separator is provided and includes a vessel and a scupper. The vessel includes a curved, inwardly facing surface defining an inlet, an outlet and a drain. The scupper is disposed within the vessel to define a first flowpath from the inlet to the drain between the curved, inwardly facing surface and a first side of the scupper, and a second flowpath along a second side of the scupper, which is opposite the first side.

According to yet another aspect of the invention, a particle separator is provided and includes a vessel including a curved, inwardly facing surface defining an inlet and an outlet, which is coplanar with the inlet, and a drain and a scupper disposed within the vessel to define a first flowpath from the inlet to the drain between the curved, inwardly facing surface and a first side of the scupper, and a second flowpath along a second side of the scupper, which is opposite the first side.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, high-speed inlet air is ducted tangentially to an outer wall of a substantially cylindrical collector. A scupper arrangement provides for the separation of the water from the inlet air and provides for the collection of the water along the outer wall due to centrifugal force. A unique feature is that the outlet is arranged to recover the energy from the swirling air without allowing re-entrainment of the water droplets. This recovery results in low pressure losses. Further, because no swirl vanes are needed, a volume of the device is minimized.

Figure 1:
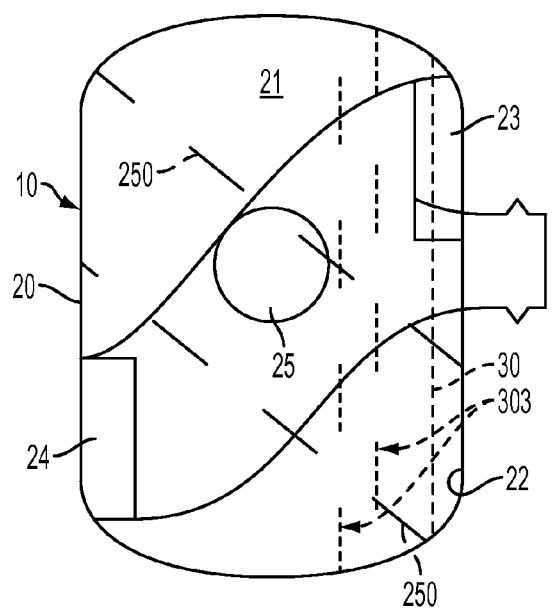
FIG. 1 is a plan view of a cross-section of a particle separator in accordance with embodiments.
Figure 2:
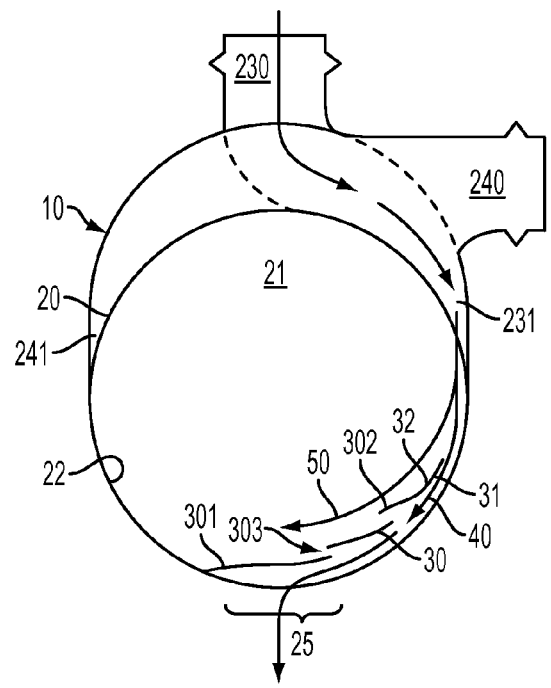
FIG. 2 is a side view of a cross-section of the particle separator of FIG. 1.

With reference to FIGS. 1 and 2, a particle separator 10 is provided for use in an aircraft. The particle separator 10 includes a vessel 20 and a scupper 30. The vessel 20 includes a body 21. The body 21 includes a curved, inwardly facing surface 22 that defines an inlet 23, which permits tangential fluid ingress into the vessel 20, an outlet 24, which permits tangential fluid egress from the vessel 20, and a drain 25. The outlet 24 may be coplanar with the inlet 23. The scupper 30 has a first side 31 that faces the curved, inwardly facing surface 22 and a second side 32, which is opposite the first side 31. The scupper 30 is disposed within an interior of the vessel 20 to define a first flowpath 40 and a second flowpath 50. The first flowpath 40 extends from the inlet 23 to the drain 25 and is defined between the curved, inwardly facing surface 22 and the first side 31 of the scupper 30. The second flowpath 50 may extend from the inlet 23 to the outlet 24 and is defined along the second side 32 of the scupper 30.

The particle separator 10 may further include an inlet chamber 230, an outlet chamber 240 and turning vanes 250. The inlet chamber 230 is fluidly communicative with the inlet 23 and the outlet chamber 240 is fluidly communicative with the outlet 24. The vessel 20 has a substantially cylindrical shape and the inlet chamber 230 and the outlet chamber 240 connect to sidewalls of the vessel 20. Thus, taken together and, as shown in FIG. 2, the vessel 20, the inlet chamber 230 and the outlet chamber 240 have a combined oblong shape. In addition, an exit portion 231 of the inlet chamber 230 and an inlet portion 241 of the outlet chamber 240 are defined at opposite sides of the vessel 20. Also, the turning vanes 250 redirect fluid flow within the vessel 20 from a position associated with the outlet 24 to a position associated with the inlet 23. The inlet and outlet chambers 230 and 240 are then wrapped around one another to permit possible coplanarity of the inlet 23 and the outlet 24.

Within the aircraft, the vessel 20 may be disposable with the drain 25 disposed at a lowermost point of the vessel 20 relative to a gravitational frame of reference. That is, the image of FIG. 1 is provided from below the vessel 20 such that the drain 25 appears in a central portion of the curved, inwardly facing surface 22 and the image of FIG. 2 is provided from a long side of the vessel 20 such that the drain 25 appears at a bottom of the vessel 20 and the scupper 30. Thus, as fluid (i.e., a mixture of air and water) flows from the inlet 23 into the first flowpath 40, the water tends to flow along the curved, inwardly facing surface 22 toward the drain 25 and then out of the vessel 20 through the drain 25 due to gravitational forces.

The scupper 30 may extend along an entire axial length of the vessel 20 and includes a first portion 301 and a second portion 302. The first portion 301 of the scupper 30 is connected with the curved, inwardly facing surface 22 of the vessel 20 at a point proximate to the drain 25 on an opposite side of the drain 25 from the inlet 23. The first portion 301 tapers away from the curved, inwardly facing surface 22 and leads to the second portion 302 of the scupper 30. The second portion 302 is attached to a distal end of the first portion 301. The second portion 302 is disposed to cross over the drain 25 and extends toward the inlet 23. The second portion 302 is formed to define vents 303 permitting fluid communication between the first flowpath 40 and the second flowpath 50. In accordance with embodiments, the second portion 302 may have a curvature that is similar to a curvature of the curved, inwardly facing surface 22.

The second portion 302 of the scupper 30 extends around a corresponding portion of the curved, inwardly facing surface 22 of the vessel 20 but stops short of the inlet 23. Thus, the fluid tangentially entering the vessel 20 by way of the inlet 23 encounters the second portion 302 of the scupper 30 and proceeds along either the first flowpath 40 or the second flowpath 50. Due to gravitational and centrifugal forces, the water in the fluid tends to flow along the curved, inwardly facing surface 22 and, thus, most if not all of the water will enter the first flowpath 40. Air, on the other hand, will enter the first flowpath 40 and the second flowpath 50. Pressure losses due to the air entering the first flowpath 40 as opposed to the second flowpath 50 are avoided as the presence of the vents 303 permit air but not water to flow from the first flowpath 40, through the scupper 30 and into the second flowpath 50.

Figure 3:
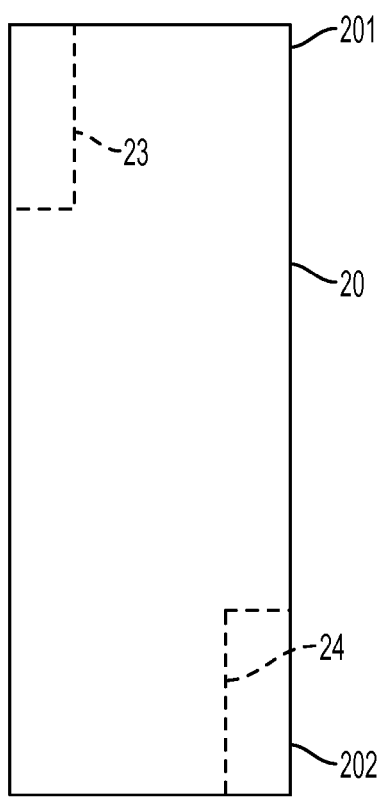
FIG. 3 is a schematic view of a particle separator in accordance with alternative embodiments.
Figure 4:
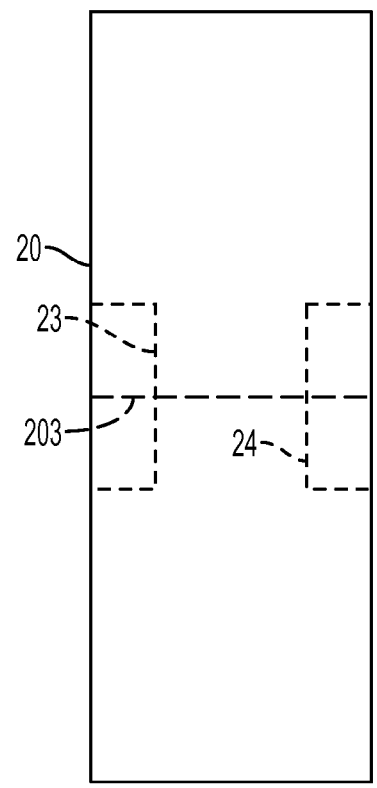
FIG. 4 is a schematic view of a particle separator in accordance with alternative embodiments.

The embodiments described above are exemplary and it is to be understood that other configurations are possible. Primary alternate configurations would have different inlet 23 and outlet 24 locations (the above-noted optional coplanarity of the inlet 23 and the outlet 24 is not required and is reflective of a single particular application of the particle separator 10). As examples, with reference to FIGS. 3 and 4, the inlet 23 and the outlet 24 can be coplanar or non-coplanar, they may be disposed at opposite longitudinal ends 201, 202 of the vessel 20 (see FIG. 3) or one or both of the inlet 23 and the outlet 24 may be disposed along a longitudinal center line 203 of the vessel 20. In any case, locations and geometries of the scupper 30 and the vents 303 may be varied in accordance with particular applications of the particle separator 10. Similarly, ratios of a diameter of the vessel 20 to a height of the vessel 20 an inlet 23 diameter or an outlet 24 diameter may be variable in accordance with the particular applications of the particle separator 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A particle separator, comprising:
  a vessel, which is receptive of a fluid flow and configured to output the fluid flow at first and second outlets, the vessel including a curved, inwardly facing surface that has a major longitudinal axis and defines an interior extending with a substantially uniform interior width along the major longitudinal axis; and
  a scupper disposed within the vessel to extend along an entire axial length of the vessel to define:
  a first flowpath along which the received fluid flow is directed to flow toward the first outlet between the curved, inwardly facing surface and a first side of the scupper, and
  a second flowpath along which the received fluid flow is directed to flow toward the second outlet along a second side of the scupper, which is opposite the first side.

2. The particle separator according to claim 1, wherein the vessel is disposable with the first outlet disposed at a lowermost point relative to a gravitational frame of reference.

3. The particle separator according to claim 1, wherein the scupper is connected with the curved, inwardly facing surface of the vessel at a point proximate to the first outlet and crosses over the first outlet and a portion of the scupper that crosses over the first outlet has a similar curvature as the curved, inwardly facing surface of the vessel.

4. The particle separator according to claim 1, wherein the scupper is formed to define vents configured to permit fluid communication from the first flowpath to the second flowpath.

5. The particle separator according to claim 1, further comprising:
  an inlet chamber, from which the vessel receives the fluid flow; and
  an outlet chamber, which is fluidly communicative with the second outlet.

6. The particle separator according to claim 5, wherein the vessel, the inlet chamber and the outlet chamber have a combined oblong shape.

7. The particle separator according to claim 5, wherein an exit portion of the inlet chamber and an inlet portion of the outlet chamber are defined at opposite sides or opposite ends of the vessel.

8. The particle separator according to claim 5, wherein the inlet and outlet chambers are wrapped around one another.

9. A particle separator, comprising:
  a vessel including a curved, inwardly facing surface defining an inlet, an outlet and a drain,
  the surface having a major longitudinal axis and further defining an interior extending with a substantially uniform interior width along the major longitudinal axis; and
  a scupper disposed within the vessel to extend along an entire axial length of the vessel to define:
  a first flowpath from the inlet to the drain between the curved, inwardly facing surface and a first side of the scupper, and
  a second flowpath along a second side of the scupper, which is opposite the first side.

10. The particle separator according to claim 9, wherein the vessel is disposable with the drain disposed at a lowermost point relative to a gravitational frame of reference.

11. The particle separator according to claim 9, wherein:
  the scupper is connected with the curved, inwardly facing surface of the vessel at a point proximate to the drain, crosses over the drain and extends toward the inlet, and
  a portion of the scupper that crosses over the drain and extends toward the inlet has a similar curvature as the curved, inwardly facing surface of the vessel.

12. The particle separator according to claim 9, wherein the scupper is formed to define vents configured to permit fluid communication from the first flowpath to the second flowpath.

13. The particle separator according to claim 9, further comprising:
an inlet chamber, which is fluidly communicative with the inlet; and
an outlet chamber, which is fluidly communicative with the outlet.

14. The particle separator according to claim 13, wherein the vessel, the inlet chamber and the outlet chamber have a combined oblong shape.

15. The particle separator according to claim 13, wherein an exit portion of the inlet chamber and an inlet portion of the outlet chamber are defined at one of opposite sides of the vessel, opposite ends of the vessel or along a center line of the vessel.

16. The particle separator according to claim 13, wherein the inlet and outlet chambers are wrapped around one another.

17. A particle separator, comprising:
a vessel including a curved, inwardly facing surface defining an inlet and an outlet, which is coplanar with the inlet, and a drain,
the surface having a major longitudinal axis and further defining an interior extending with a substantially uniform interior width along the major longitudinal axis; and
a scupper disposed within the vessel to extend along an entire axial length of the vessel to define:
a first flowpath from the inlet to the drain between the curved, inwardly facing surface and a first side of the scupper, and
a second flowpath along a second side of the scupper, which is opposite the first side.

* * * * *